United States Patent
Naidu et al.

(10) Patent No.: US 12,487,267 B2
(45) Date of Patent: Dec. 2, 2025

(54) FAULT LOCATION DETERMINATION IN A POWER TRANSMISSION SYSTEM

(71) Applicant: Hitachi Energy Ltd, Zürich (CH)

(72) Inventors: Od Naidu, Karnataka (IN); Neethu George, Karnataka (IN); Preetham Venkat Yalla, Karnataka (IN); Suresh Maturu, Andhra Pradesh (IN)

(73) Assignee: Hitachi Energy Ltd, Zürich (CH)

( * ) Notice: Subject to any disclaimer, the term of this patent is extended or adjusted under 35 U.S.C. 154(b) by 311 days.

(21) Appl. No.: 18/024,702

(22) PCT Filed: Sep. 16, 2021

(86) PCT No.: PCT/EP2021/075449
§ 371 (c)(1),
(2) Date: Mar. 3, 2023

(87) PCT Pub. No.: WO2022/058410
PCT Pub. Date: Mar. 24, 2022

(65) Prior Publication Data
US 2023/0324451 A1  Oct. 12, 2023

(30) Foreign Application Priority Data

Sep. 17, 2020 (IN) .............................. 202041040309
Jan. 18, 2021 (EP) ...................................... 21152166

(51) Int. Cl.
*G01R 31/08* (2020.01)
(52) U.S. Cl.
CPC ................................. *G01R 31/086* (2013.01)

(58) Field of Classification Search
None
See application file for complete search history.

(56) References Cited

U.S. PATENT DOCUMENTS 6,661,630 B1    12/2003  Ahn
2011/0166720 A1*  7/2011  Su ............................ H02H 3/40
                                            700/292

FOREIGN PATENT DOCUMENTS

| JP | S51-118044 A | 10/1976 |
| JP | S52-43956 A | 4/1977 |
| JP | S53-67839 A | 6/1978 |
| JP | H4-50672 A | 2/1992 |
| JP | H4299272 A | 10/1992 |
| JP | H11-142465 A | 5/1999 |
| JP | 2001-016762 A | 1/2001 |
| JP | 2007-97265 A | 4/2007 |
| JP | 2012-220383 A | 11/2012 |

(Continued)

OTHER PUBLICATIONS

A Comparison of Impedance Based Fault Location Methods for Power Underground Distribution Systems; Enrique et al; 2016.*

(Continued)

*Primary Examiner* — Farhana A Hoque
(74) *Attorney, Agent, or Firm* — PROCOPIO, CORY, HARGREAVES & SAVITCH LLP

(57) ABSTRACT

Fault location determination in a power transmission system is described. Samples of voltage and current measured are obtained for each phase at a terminal. A first equivalent reactance value based on the samples of voltage and current is calculated. Further, based on the calculated equivalent reactance value a first fault location is determined.

18 Claims, 12 Drawing Sheets

(56) References Cited

FOREIGN PATENT DOCUMENTS

| JP | 2017-49093 A | 3/2017 |
|---|---|---|
| JP | 2017-101931 A | 6/2017 |
| KR | 10-2011-0078578 A | 7/2011 |
| WO | 2011/072732 A1 | 6/2011 |
| WO | 2012/037947 A1 | 3/2012 |
| WO | 2017/141327 A1 | 8/2017 |

OTHER PUBLICATIONS

Naidu et al., "A method for locating faults during power swing using local measurements", Year unknown, 8 pages.

Adu, "A New Transmission Line Fault Locating System", IEEE Transactions on Power Delivery, vol. 16, No. 4, Oct. 2001, pp. 498-503.

Mechraoui et al., "A New Blocking Principle With Phase And Earth Fault Detection During Fast Power Swings For Distance Protection", 10, No. 3, Jul. 1995, New York US, pp. 1242-1248, XP 000557311.

Personal et al., "A Comparison of Impedance-Based Fault Location Methods for Power Underground Distribution Systems", Dec. 7, 2016, www.mdpi.com/journal/energies, doi:10.3390/en9121022, 30 pages.

\* cited by examiner

FAULT LOCATION DETERMINATION IN A POWER TRANSMISSION SYSTEM

CROSS-REFERENCE TO RELATED APPLICATIONS

The present application is a national stage entry of International Patent Application No. PCT/EP2021/075449, filed on Sep. 16, 2021, which claims priority to Indian Patent Application number 202041040309, filed on Sep. 17, 2020, and European Patent Application No. 21152166.1, filed on Jan. 18, 2021, which are both hereby incorporated herein by reference as if set forth in full.

TECHNICAL FIELD

The present subject matter relates, in general, to fault location determination in power transmission lines. In particular, the present subject matter relates to fault location determination during power swing in a power transmission system.

BACKGROUND

An electric power transmission system is a large and complex network that comprises transmission lines with numerous electrical components, such as generators, transformers, shunt reactors, etc. Power systems are often subjected to system disturbances, such as transmission line faults, loss of generation units, switching operations in heavily loaded transmission lines, changes in load magnitudes and direction etc. Generally, a fault may be defined as an abnormal condition of the electrical system causing disruption in the normal flow of electric current. This deviated flow of electric current causes changes in voltage and/or current flow, which interrupts power transmission. System disturbances that occur in transmission systems can cause power swings.

Power swing is a phenomenon in which rotor angles of groups of generators accelerate or decelerate relative to each other, which results in a variation in the three-phase power flow. Power swings, especially inter-area swings, may result in large fluctuations of power between two areas of a power system connected via tie lines.

BRIEF DESCRIPTION OF DRAWINGS

The features, aspects, and advantages of the present subject matter will be better understood with regard to the following description and accompanying figures. The use of the same reference number in different figures indicates similar or identical features and components.

SUMMARY

Figure 1A:
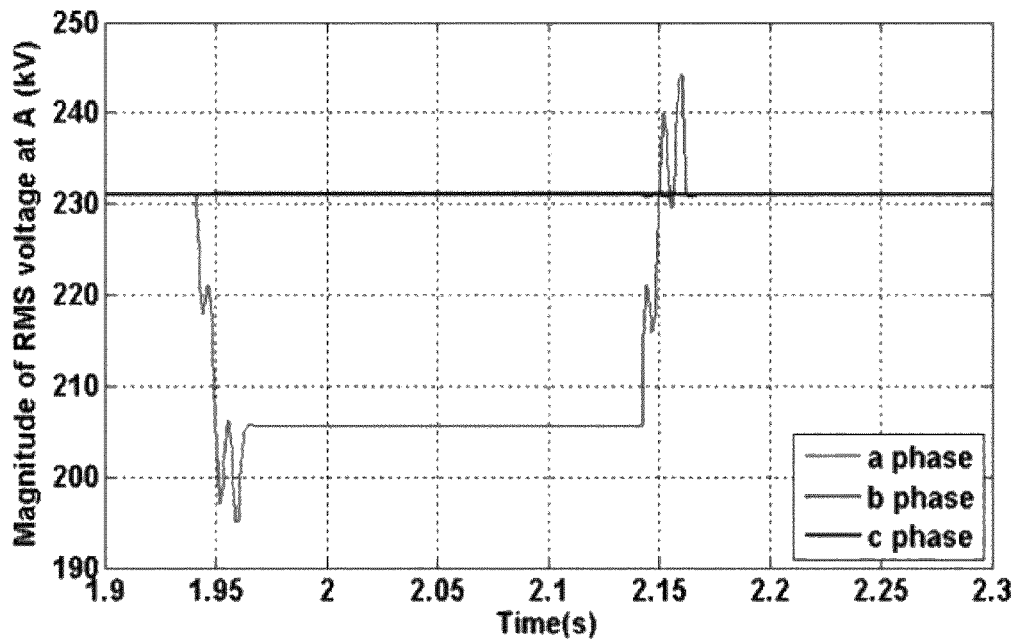
FIGS. 1(a) and 1(b) in a first example illustrate monitoring of three phase RMS voltage for an A-g fault during normal system in a power transmission line for determining the fault location based on a method known in the art.

Embodiments of the present invention provide determining a fault location during power swing in a power transmission system, a device for fault location determination, and a computer readable storage medium for fault location determination. Objectives of embodiments of the invention may be that the proposed methods and devices bring down the operation time of distance protection by 50% to about 5 ms in average. Further, the proposed time-domain based fault location solution can be used for single-ended location of normal faults. The present subject matter utilizes voltages and currents measured from the local terminals and hence avoids loss of data over communication.

According to a first aspect, a method for determining a fault location in a power transmission system is provided. The method comprises obtaining samples of voltage and current measured at a terminal of the transmission line during a fault. Based on the samples of voltage and current, a first equivalent reactance value is calculated. Based on the calculated equivalent reactance value, a first fault location is determined.

According to a second aspect, it provides a device for determining a fault location in a power transmission system is provided. The device comprises a processor and a fault location determination module executable by the processor. The fault location determination module is configured to obtain samples of voltage and current measured at a terminal of the transmission line during a fault. The fault location determination module is configured to calculate a first equivalent reactance value based on the samples of voltage and current. Based on the calculated equivalent reactance value a first fault location is determined.

According to a third aspect a non-transitory computer readable medium containing program instruction which when executed causes a device to determine a fault location in a power transmission system.

According to one implementation, voltage measurements and current measurements are obtained in each phase at the terminal of the shunt capacitor bank.

According to another implementation, at least one subsequent equivalent reactance value based on subsequent samples of voltage and current is calculated and based on the calculated respective at least one subsequent equivalent reactance value at least one subsequent fault location is determined.

According to another implementation, a refined fault location based on detection of a convergence between the first fault location and the at least one subsequent fault location is determined.

According to another implementation, the convergence is detected when a difference between two consecutive ones of the first fault location and the at least one subsequent fault location is smaller than a threshold.

According to another implementation, the refined fault location is an average of at least a subset of the first fault location and the least one subsequent fault location.

According to another implementation, where the method is executed during a power swing.

According to another implementation, the respective equivalent reactance value is computed as a function of sine of angle equivalent of step time and samples of voltage and current.

According to another implementation, where averaged values of the samples of voltage and current are used for calculating the equivalent reactance value.

According to another implementation, where the averaged values of the samples of voltage and current are formed by applying a first moving window average filter to the samples of voltage and current.

According to another implementation, where the respective fault location is determined by dividing the corresponding equivalent reactance value by a per unit reactance of the transmission line.

According to another implementation, where an average of the first fault location and the least one subsequent fault location is formed by applying a second moving window average filter to the fault location estimates.

According to another implementation, a zone-limpedance for distance protection is calculated based on the fault location.

According to another implementation, the voltage and current measurements are single-ended time domain-based measurements.

DETAILED DESCRIPTION

The present subject matter relates to fault location determination in a power transmission system. The following describes fault location determination in relation to power swings. The subject matter, however, is not restricted to the fault location determination during power swings.

During a power swing period, the distance relay, in general, will be blocked from operation to prevent maloperations. If a fault occurs during the blocking period of the distance relay, it should be able to detect and clear the fault. Modern relays can detect and clear faults during power swings. Restoration of power supply after permanent faults can be done only after the maintenance team repairs the damage caused by the fault. Inspecting high voltage transmission lines running up to hundreds of kilometres for identifying exact fault point is tedious and time consuming. Therefore, it is desirable to know an accurate fault location to avoid inspecting the whole transmission line to find the exact fault point.

Conventionally, fundamental phasors are used for determining a fault location. Various algorithms for estimation of phasors from voltage and current measurement signals are known. The most commonly used methods are full-cycle Discrete Fourier Transform (DFT) or least square methods. However, modulation of voltage and current signals during power swing introduces a considerable error to the phasor estimations using DFT or any traditional phasor estimation techniques known in the art. Erroneous phasor estimates lead to an error in calculating the fault locations. Hence, during such power system conditions, the fault location may not be reliably calculated.

In one conventional technique for determining the fault location, a fault locator uses phase currents and voltages recorded at the terminal where the relay is placed. The distance to fault is then computed using the fundamental component phasors calculated from the voltage and current signals. The solution includes a compensation for pre-fault load current effects. However, this technique requires fault type information to identify the loop voltages and currents to be used for computing the final solution. It also requires the pre-set or calculated values of the impedances of the network connected at the both ends of transmission line, i.e., equivalent source impedances at the local and remote terminals of the transmission line are used as an input.

The above-mentioned conventional technique is illustrated with the help of an example and the performance of the system is analyzed for faults during normal system operation and faults during power swing. A 400-kV, 50 Hz single circuit transmission line of length 200 km is modelled and tested. With identical system parameters and fault case parameters, two fault scenarios are simulated and studied. The first fault scenario considered, is during normal system operation at system frequency of 50 Hz. The second fault scenario considered, is during a power swing with a slip frequency of 1 Hz. In both the cases, the fault considered is a line-to-ground A-g fault at a distance of 20 km from terminal A, which is 10% of the transmission line with a fault resistance of 5 ohms. The fundamental component phasors from the voltage and current signals for both fault scenarios are calculated using the Least Squares method.

Figure 1B:
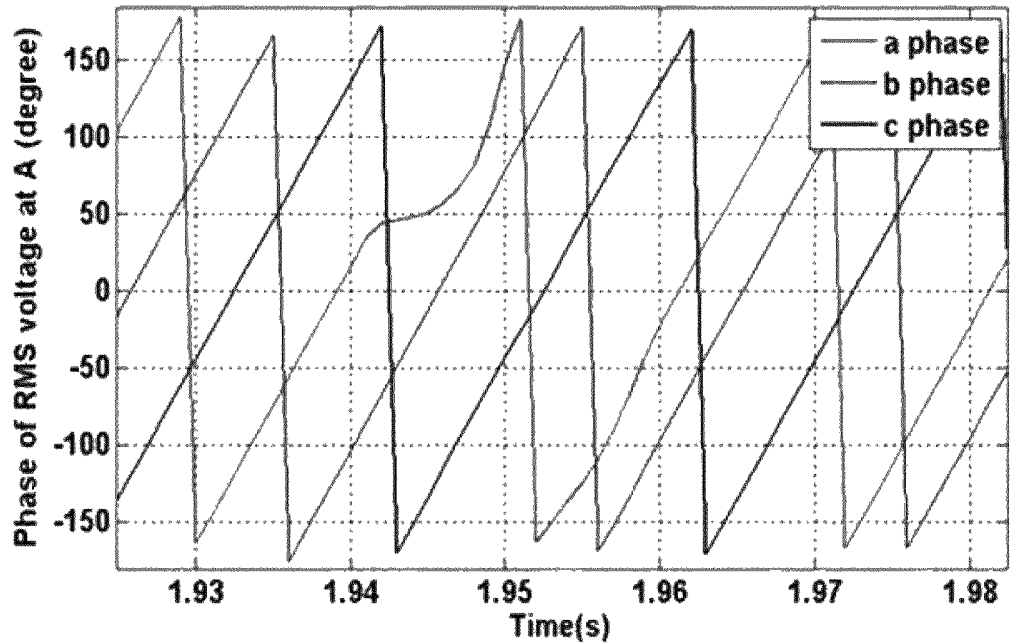

FIGS. 1(a) and 1(b) in a first example illustrate monitoring of three phase RMS voltage for an A-g fault during normal system operation in a power transmission line for determining the fault location based on a method known in the art. FIG. 1(a) depicts the magnitude plot of the three phase RMS voltage for an A-g fault during normal system operation and FIG. 1(b) depicts the phase plot of the three phase RMS voltage at a terminal for an A-g fault during normal system operation. The inception of fault occurs at 1.94 s and is cleared at 2.14 s. As it can be observed from the magnitude plot, the pre-fault voltage magnitude of phase-A stays constant at 231 kV and on occurrence of a fault, the magnitude of voltage dips and settles to a steady value of 205 kV. On fault clearance, the voltage magnitude picks up again and settles to the steady pre-fault value of 231 kV.

Figure 2A:
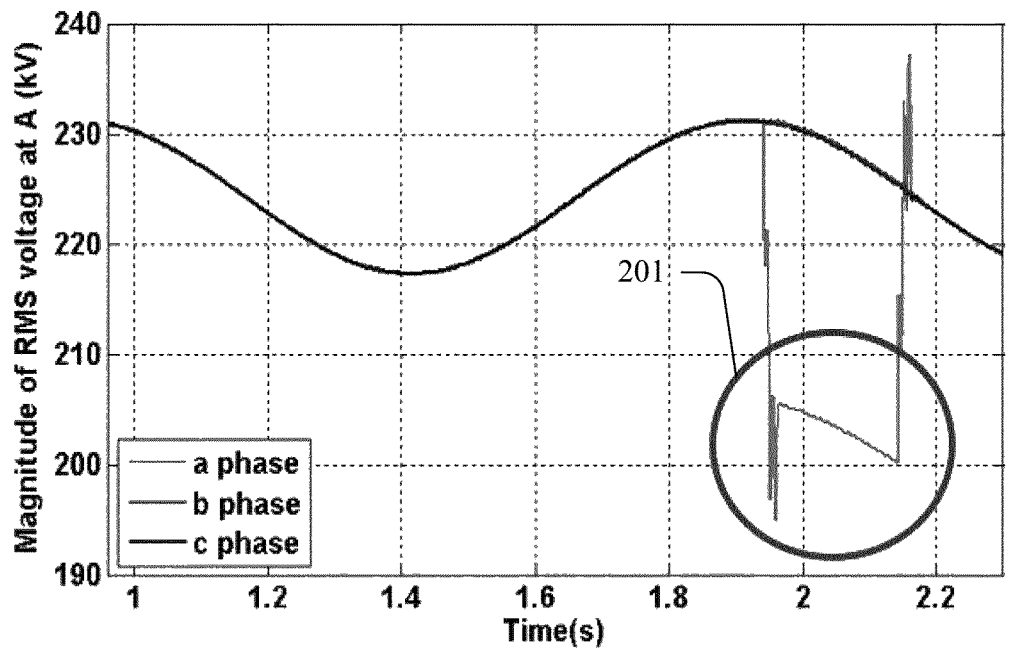
FIGS. 2(a) and 2(b) in a second example illustrate monitoring of three phase RMS voltage for A-g fault during power swing in a power transmission line for determining the fault location based on a method known in the art.
Figure 2B:
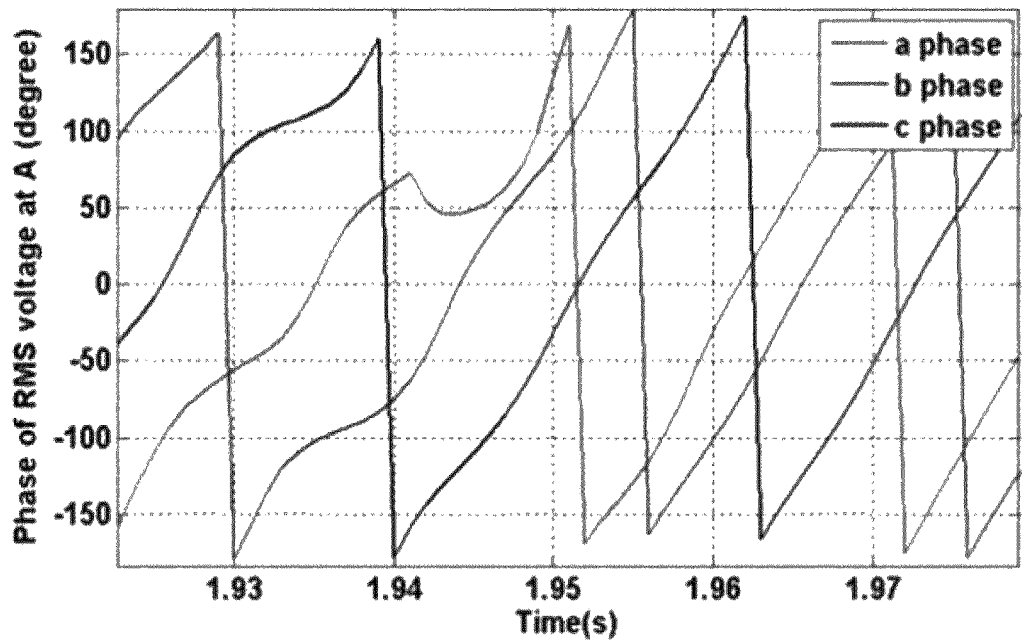

FIGS. 2(a) and 2(b) in a second example illustrate monitoring of three phase RMS voltage for A-g fault during power swing in a power transmission line for determining the fault location based on a method known in the art. In this example three phase voltage waveforms have been depicted for the sake of discussion. However, the current waveforms and current phasor calculations would also give similar results. FIG. 2(a) depicts the magnitude plot of the three phase RMS voltage for an A-g fault during power swing and FIG. 2(b) depicts the phase plot of the three phase RMS voltage phasor at a terminal for an A-g fault during a power swing. The inception of fault occurs at 1.94 s and is cleared at 2.14 s. As it can be observed from FIG. 2(a), the pre-fault voltage magnitude of phase-A oscillates as expected with peak value 231 kV. However, once the fault occurs, the magnitude of voltage dips but does not reach a steady value. This is marked with the help of a circle 201 in FIG. 2(a). That is, the voltage magnitude during fault varies with time and hence the phasor estimation algorithm gives different estimates for different data windows. This in turn causes the fault location estimates to be different for different data windows after fault.

A comparison between the determination of the fault location under normal operation and during power swings computed, in accordance with the technique discussed above is depicted in Table 1. It can be observed that the fault location accuracy is acceptable for faults during normal operation. However, for a fault during power swing, it is observed that the error in calculating the fault location is as high as 15%, which is 30 km for a 200 km transmission line, thereby requiring a lot of time and resources for identifying the exact fault location.

TABLE 1

COMPARISON OF ERROR IN FAULT LOCATION DETERMINED FOR FAULTS DURING NORMAL OPERATION AND POWER SWING

| Test Case | Error in fault location (%) | |
| --- | --- | --- |
| | Fault during normal system operation | Fault during power swing |
| A-g fault at 5 km, Rf - 10 ohms | 0.67 | 5.3 |
| A-g fault at 80 km, Rf - 10 ohms | 0.71 | 11.3 |
| A-g fault at 190 km, Rf - 10 ohms | 0.83 | 15.7 |
| BC fault at 5 km, Rf - 5 ohms | 0.43 | 4.7 |
| BC fault at 80 km, Rf - 5 ohms | 0.55 | 9.3 |
| BC fault at 190 km, Rf - 5 ohms | 0.73 | 11.7 |
| BC-g fault at 5 km, Rf - 5 ohms | 0.45 | 5.1 |
| BC-g fault at 80 km, Rf - 5 ohms | 0.56 | 10.4 |
| BC-g fault at 190 km, Rf - 5 ohms | 0.69 | 14.9 |

Hence, it can be concluded that calculating the fault location based on the fundamental component phasors calculated from modulated voltage and current signals due to power swing introduces considerable error to the phasor estimations. This is because the normal phasor estimation methods do not give accurate phasors during power swing. Hence, there is a need for a single-ended fault location which works accurately for faults during power swing.

The present subject matter provides for an accurate single-ended fault location determination during power swing in a power transmission system. Determining the fault location is based on instantaneous values of three phase voltages and currents measured at the local terminal where the relay is placed. An example method comprises measuring samples of voltage and current at a terminal of the transmission line. The signals are sampled according to a configured sampling frequency to obtain sampled values of voltages and currents. The sampled values can be obtained for every instant in a measurement cycle. For example, a measurement cycle can be of 20 milliseconds (50 Hz frequency) and samples can be available at each millisecond at 1 kHz sampling frequency. An averaged value of the samples of current and voltage is computed. A first equivalent reactance value is calculated based on is calculated based on the samples of voltage and current. Based on the calculated equivalent reactance value, a first fault location estimate is determined.

The proposed methods and devices bring down the operation time of distance protection by 50% and to about 5 ms in average. Further, the proposed time-domain based fault location solution can be used for single-ended location of normal faults. The present subject matter utilizes voltages and currents measured from the local terminals and hence avoids loss of data over communication. Further, the system does not require source impedance information from any other terminals. The proposed solution is also cost effective as additional installation of GPS may be avoided.

The above and other features, aspects, and advantages of the subject matter will be better explained with regard to the following description and accompanying figures. Wherever possible, the same reference numbers are used in the drawings and the following description to refer to the same or similar parts. While several examples are described, modifications, adaptations, and other implementations are possible.

Figure 3:
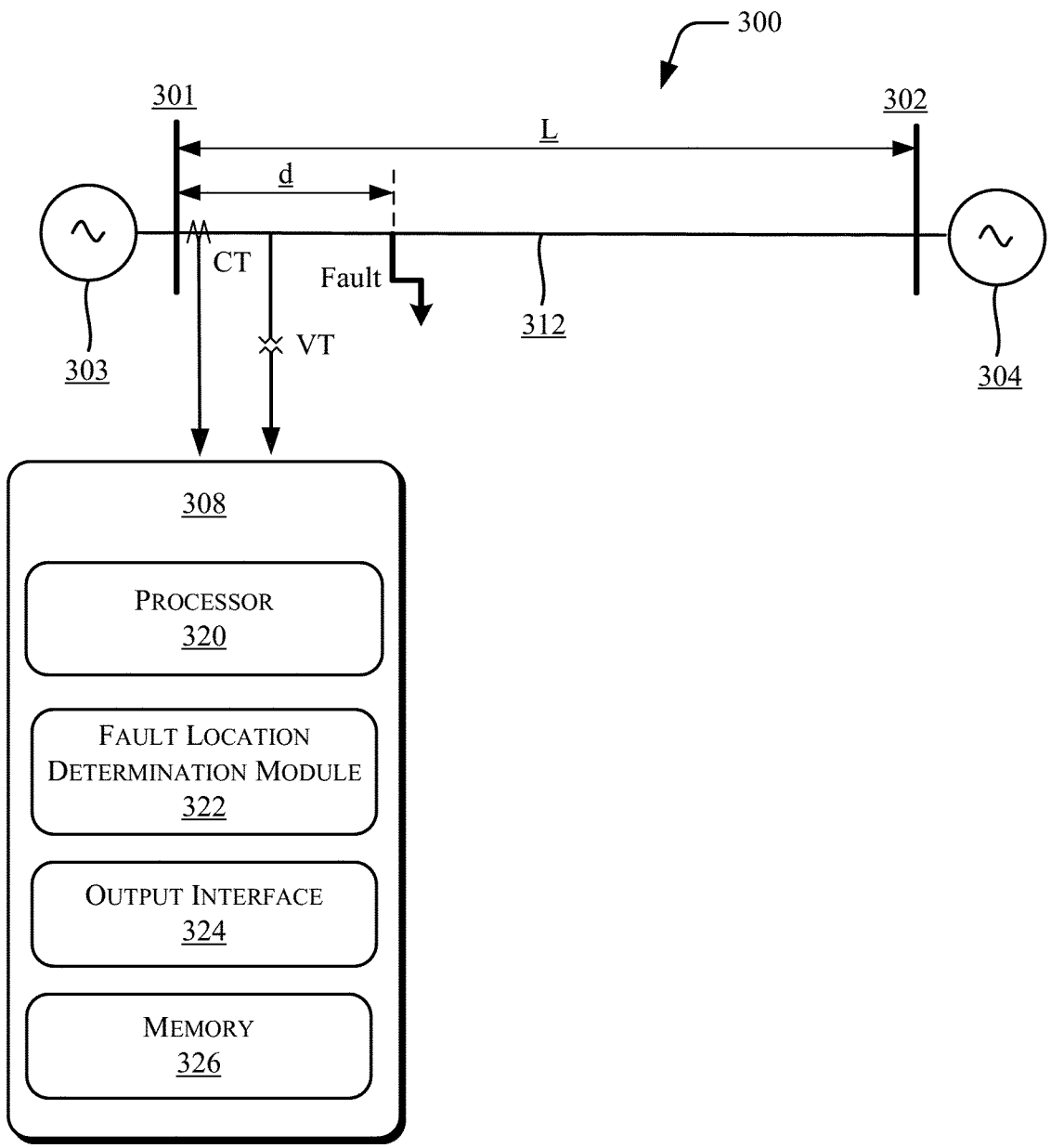
FIG. 3 illustrates a block diagram of a two-source equivalent electrical network, in accordance with an embodiment of the present subject matter.

FIG. 3 illustrates a block diagram of a two-source equivalent electrical network, in accordance with an embodiment of the present subject matter. The two-source equivalent electrical network 300 comprises a power transmission line 312 connected between two terminals Bus M 301 and Bus N 302. The two-electrical sources, namely sources 303 and 304 supply power to Bus M 301 and Bus N 302 respectively. In one example, the sources 303 and 304 may be power generators, such as synchronous power generators. The electrical network 300 may transmit electric power at high voltages, such as in the range of kilovolts, and for long distances, such as for tens or hundreds of kilometres.

It will be understood that that the two-terminal test system 300 for fault location determination may include a plurality of additional components or devices for monitoring, sensing, and controlling various parameters that may be associated with the transmission lines but are not shown for brevity. For example, components such as circuit breakers, sensors, current transformers, voltage transformers, loads connected to the transmission lines, shunt reactors, intelligent electronic devices IEDs, protective relays and the like may be connected to the transmission line.

The techniques of the present subject matter may be implemented with one or more devices associated with the power transmission line. The devices may include current transformers, voltage transformers, circuit breakers, and devices to determine the fault location. As shown in FIG. 3, a device 308 may be receive voltage and current measurements associated with Bus M 301, also referred to as first terminal. The voltage transformer at each terminal is depicted as VT and the current transformer at each terminal is depicted as CT. The device 308 may be configured to detect a power swing in a power transmission line using techniques known in the art and subsequently detect a fault during the power swing. In response to that the device 308 detects the fault in the power swing in the power transmission line, the device 308 may be configured to send a trip signal. In one example, the device 308 may be an intelligent electronic device (IED). In other examples, the device 308 may be any computing device, such as a server, a desktop device, a laptop, etc., which may receive the measurements from an IED In an example, the present subject matter may be implemented by one or more modules. The modules may be implemented as instructions executable by one or more processors. For instance, in the example where the device 308 performs the method, the modules are executed by the processors of the device 308. In case the method is implemented in part by the device 308 and in part by a server, the modules (depending on the step) will be distributed accordingly in the device 308 and the server.

In one example, the device 308 may be configured to receive input measurement signals from various measurement equipment connected to the transmission line 312, such as current transformers, potential transformers, Rogowski coils or other measurement sensors. The device 308 may process the measurements obtained with the help of a processor 320. The processor 320 may be implemented as a dedicated processor, a shared processor, or a plurality of individual processors, some of which may be shared. The device 308 may comprise a memory 326, that may be communicatively connected to the processor 320. Among other capabilities, the processor 320 may fetch and execute computer-readable instructions, stored in the memory 326. In one example, the memory 326 may store a fault location determination module 322. In other examples, the fault location determination module 322 may be external to the memory 326. The memory 326 may include any non-transitory computer-readable medium including, for example, volatile memory, such as RAM, or non-volatile memory, such as EPROM, flash memory, and the like.

In one example, on detecting a fault during a power swing in the transmission line, a method to determine a fault location may be performed by the device 308. For discussion, the method for determining a fault location is described with reference to the device 308 implemented at terminal M 301. However, a similar method can be executed by a device at terminal N 302 as may be understood.

To determine a fault location on detecting the fault during a power swing, the processor 320 of the device 308 may fetch instructions to execute a fault location determination module 322 to obtain samples of voltage and current measured at a terminal of the transmission line during a fault. In one example, the samples of voltage and current measured may be instantaneous voltage measurements and current measurements in each phase at a terminal of the transmission line measured during a fault. The voltage measurements and the current measurements are obtained with one or more measurement equipment associated with the terminal. The voltage and current measurements obtained from the measurement transformers might contain transients and noise signals which can affect the accuracy of the solution. Hence, pre-processing of the voltage and current measurements is desirable. In one example, the pre-processing of the samples of voltage and current measured at the terminal 301 may comprise computing averaged values of the samples of voltage and current measured at the terminal 301.

In one example, computing the averaged values of the samples of voltage and current may comprise applying a first moving window average filter to the samples of voltage and current measurements. The first moving window average may be applied to smoothen the voltage and current waveforms measured. The size of the first moving window applied may take any positive integer value from 2 to 'n' samples, where 'n' is a positive integer value. In one example, the size of first moving window considered may be 5 samples to smoothen the waveforms.

Based on the samples of voltage and current the processor 320 may calculate a first equivalent reactance value. The first equivalent reactance may be computed based on averaged values of the samples of voltage and current. Similarly, at least one subsequent equivalent reactance value based on subsequent samples of voltage and current may be calculated. In one example, the equivalent reactance may be calculated as explained below. $V_a$ may be considered as the sample voltage measured at the terminal M 301 and $I_a$ may be considered as the sample current measured at the terminal M 301. The phase angle between $V_a$ and $I_a$ may be denoted as 'Ø'. The equations (1) to (3) depict instantaneous voltage measurements in each phase at a terminal of the transmission line at instances 'n', 'n−1' and 'n−2'. In this example, three sample values of voltages and currents measured are considered to obtain the following equations:

$$v_{n-2} = V_{am} \sin(\omega t + \emptyset - 2\sigma) \quad (1)$$

$$v_{n-1} = V_{am} \sin(\omega t + \emptyset - \sigma) \quad (2)$$

$$v_n = V_{am} \sin(\omega t + \emptyset) \quad (3)$$

where, $V_{am}$ is the peak magnitude of $V_a$, $\omega$ is the system frequency measures in radians/second, $\sigma$ is the angle equivalent of step time, where step time refers to sampling frequency.

Similarly, equations (4) to (6) depict instantaneous voltage measurements in each phase at the terminal M 301 of the transmission line at instances 'n−2', 'n−1' and 'n'.

$$i_{n-2} = I_{am} \sin(\omega t - 2\sigma) \quad (4)$$

$$i_{n-1} = I_{am} \sin(\omega t - \sigma) \quad (5)$$

$$i_n = I_{am} \sin(\omega t) \quad (6)$$

where, $I_{am}$ is the peak magnitude of terminal current $I_a$.

Further, on multiplying equation (2) with equation (6) and equation (3) with equation (5), and subtracting the resultant multiplied equations, we get equation (7) as shown below:

$$(v_{n-1} i_n - v_n i_{n-1}) = V_{am} I_{am} [\sin(\omega t + \emptyset - \sigma)\sin(\omega t) - \sin(\omega t + \emptyset)\sin(\omega t - \sigma)] \quad (7)$$

On expanding the terms $\sin(\omega t + \emptyset - \alpha)$ and $\sin(\omega t + \emptyset)$ in equation (7) and rearranging the terms we get, $$(v_{n-1} i_n - v_n i_{n-1}) = V_{am} I_{am} \sin \emptyset \sin \sigma \quad (8)$$

Similarly, on multiplying equation (4) with equation (6) and squaring equation (5), and subtracting the resultant multiplied and squared equations, we get equation (9) as shown below:

$$(i_{n-1}^2 - i_n i_{n-2}) = I_{am}^2 \{\sin^2(\omega t - \sigma) - \sin(\omega t)\sin(\omega t - 2\sigma)\} \quad (9)$$

On expanding equation (9), we get equation (10) as shown below:

$$(i_{n-1}^2 - i_n i_{n-2}) = I_{am}^2 \{0.5 - 0.5 \cos(2\omega t - 2\sigma) - 0.5 \cos(0) + 0.5 \cos(2\omega t - 2\sigma)\} \quad (10)$$

$$(i_{n-1}^2 - i_n i_{n-2}) = I_{am}^2 \{0.5 - 0.5 \cos(-2\sigma)\} \quad (11)$$

$$(i_{n-1}^2 - i_n i_{n-2}) = I_{am}^2 \{\sin^2 \sigma\} \quad (12)$$

On dividing equation (8) by equation (12), we get:

$$\frac{(v_{n-1} i_n - v_n i_{n-1})}{(i_{n-1}^2 - i_n i_{n-2})} = \frac{V_{am} I_{am} \sin \emptyset \sin \sigma}{I_{am}^2 (\sin^2 \sigma)} \quad (13)$$

On simplifying and rearranging equation (13) we get equations (14) and (15)

$$\frac{(v_{n-1}i_n - v_n i_{n-1})}{(i_{n-1}^2 - i_n i_{n-2})} = \frac{V_{am}\sin\phi}{I_{am}\sin\sigma} \quad (14)$$

$$\frac{(v_{n-1}i_n - v_n i_{n-1})}{(i_{n-1}^2 - i_n i_{n-2})}\sin\sigma = \frac{V_{am}\sin\phi}{I_{am}} \quad (15)$$

As it would be known to a person skilled in the art, that the apparent reactance, $X_f$ as seen from terminal A can be written as equation (16) depicted below:

$$X_f = \frac{V_{am}}{I_{am}}\sin(\phi) \quad (16)$$

Hence, from equations (15) and (16), we get the equivalent reactance as seen from terminal M 301 as depicted in equation (17):

$$X_f = \frac{(v_{n-1}i_n - v_n i_{n-1})}{(i_{n-1}^2 - i_n i_{n-2})}\sin\sigma \quad (17)$$

At least one subsequent equivalent reactance value based on subsequent samples of voltage and current may be calculated. Based on the respective equivalent reactance value a fault location may be determined by the fault location determination module 322. Equation (17) gives the equivalent reactance as seen from terminal M 301 which is estimated using three samples of voltage and current at an instance of time. On dividing equation (17) by line reactance of the transmission line, a fault location as shown in equation (18) may be determined.

$$d = \frac{X_f}{X} \quad (18)$$

where,
X is the line reactance and the value of X is computed as depicted in equation (19):

$$X = 2\pi\omega L \quad (19)$$

where,
ω is the system frequency measured in radians/second, and
L is the inductance of the transmission line.

The value of the line reactance may be computed and stored in the memory 326 of the device 308. At least one subsequent fault location based on the calculated respective at least one subsequent equivalent reactance value may be determined. The fault location may be calculated for respective equivalent reactance value. Further, a refined fault location may be determined based on post processing of multiple fault location estimates.

In one example of the post-processing, an average of the first fault location and the least one subsequent fault location may be formed by applying a second moving window average filter to the fault location estimates. The size of the second moving window applied may take any positive integer value from 2 to 'n' samples, where 'n' is a positive integer value. In one example, the size of second moving window considered may be 5 samples to smoothen the fault location estimates.

The second moving window average filter may be applied to reduce and remove the effect of oscillations in fault location estimates. Further, the second moving window average filter may also be applied to reduce the effect of less accurate fault location estimates that may be caused by transients in the line during measurements or other similar causes that may occur.

The fault location determination module 322 may determine a refined fault location based on detection of a convergence between the first fault location and the at least one subsequent fault location. In one example, the refined fault location is an average of at least a subset of the first fault location and the least one subsequent fault. The convergence is detected when a difference between two consecutive ones of the first fault location and the at least one subsequent fault location is smaller than a threshold. Therefore, based on the convergence of a difference between two consecutive ones of the first fault location and the at least one subsequent fault location the fault location may be determined. In one example, the threshold value may be set to 0.5% of a length of the transmission line. In one example, when determining the refined fault location, if the difference between two consecutive ones of the first fault location and the at least one subsequent fault location is greater than the threshold value for a repeated number of computations, the threshold value may be increased by a small percentage, for example 0.1% and the process of determining the fault location may be repeated.

In one example, the device 308 may be configured to determine the fault location of faults that occur during normal operation of the transmission line. Further, in another example, the device 308 may be configured to calculate a time domain-based zone-1 impedance for distance protection. In one example, the zone-1 reach may be set to 80-90% of the line length. The distance protection function may be performed using techniques known in the art.

Further, the device 308 may comprise an output interface 324 to communicate the results obtained from the fault location determination module 322, for example, to a server. In one example, when the method is implemented at a server, the device 308 may communicate the voltage and current measurements to the server through the output interface 324. The output interface 324 may include a variety of computer-readable instructions-based interfaces and hardware interfaces that allow interaction with other communication, storage, and computing devices, such as network entities, web servers, databases, and external repositories, and peripheral devices. In one example, the fault location determination parameters, voltage and current measurements, and the like may be viewed on a display connected to the output interface 324 or integrated with the device 308.

The present subject matter hence provides an efficient fault location determination technique based on the instantaneous values of voltage and currents measured, especially during power swings. The proposed fault determination technique can be implemented during faults that occur during normal operations.

Figure 4:
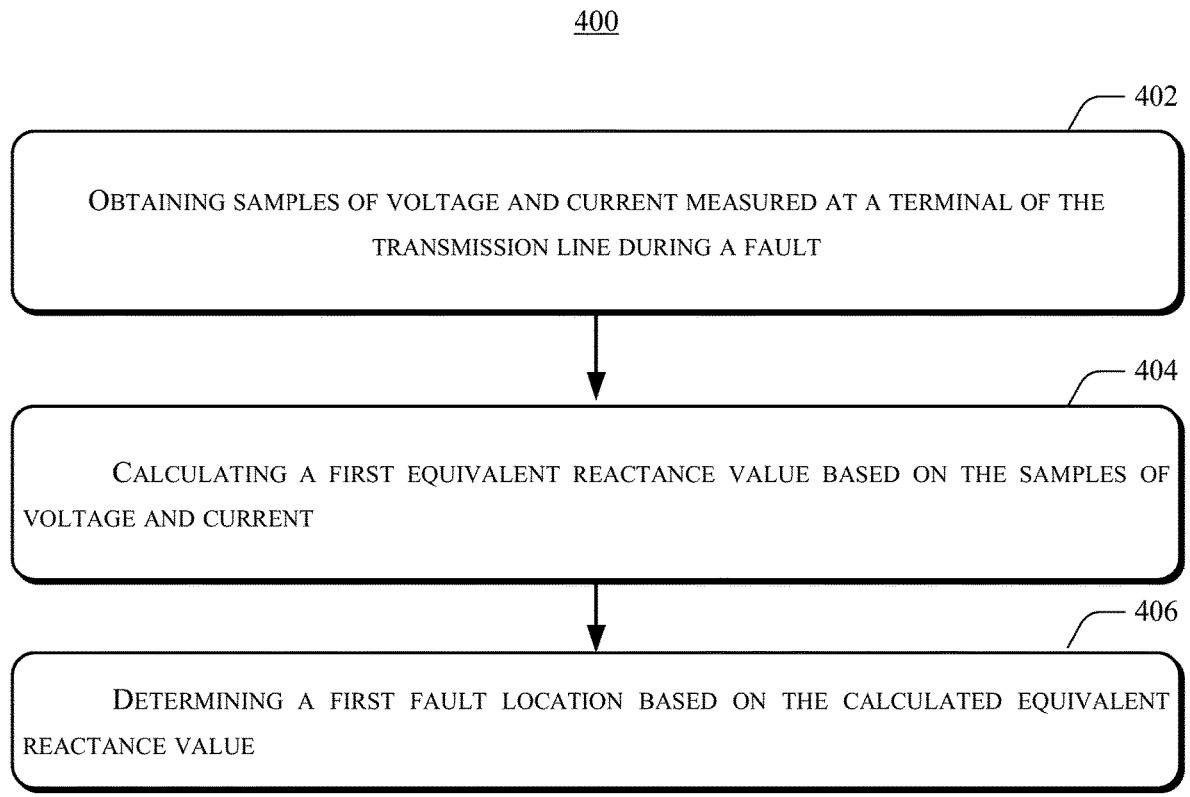
FIG. 4 illustrates a method for determining a fault location in a power transmission system, in accordance with an embodiment of the present subject matter.

FIG. 4 illustrates a method for determining a fault location in a power transmission system, in accordance with an embodiment of the present subject matter. In one example, the method 400 may be executed during a power swing. The order in which a method 400 is described is not intended to be construed as a limitation, and some of the described method blocks may be performed in a different order to implement the method 400 or an alternative method. Furthermore, the method 400 may be implemented in any suitable hardware, computer readable instructions, firmware, or combination thereof. For discussion, the method 400 is described with reference to the implementations illustrated in FIG. 3.

In the method 400 at block 402, samples of voltage and current measured at a terminal of the transmission line during a fault are obtained. In one example, the samples of voltage and current measured may be instantaneous current measurements and voltage measurements in each phase at a terminal of the transmission line measured during a fault. The voltage and current measurements may be obtained with one or more measurement equipment associated with the terminal of the power transmission system. In one example, the voltage measurement for each phase at the terminal of the power transmission system may be obtained by a voltage transformer or a potential transformer and the current measurement for each phase at the terminal of the power transmission system may be obtained by a current transformer. In one example, the current transformers and voltage transformers may be operationally connected to a device at terminal M.

At block 404, a first equivalent reactance value based on the samples of voltage and current is calculated. The equivalent reactance may be calculated based on averaged values of the samples of voltage and current. In one example, the averaged values of the samples of voltage and current may be formed based on a first predefined number of the samples of voltage and current. In one example, the averaged values of the samples of voltage and current may be formed by applying a first moving window average filter to the samples of voltage and current. In one example, the size of a first moving window is 5 samples. The value of the size of a first moving window may vary from 2 to n, where n is a positive integer value. Based on the averaged values of the samples of voltage and current, an equivalent reactance may be calculated as seen from the terminal M. In one example, three averaged sampled voltage and three averaged sampled currents may be used to calculate the equivalent reactance. Further, based on subsequent samples of voltage and current at least one subsequent equivalent reactance value may be calculated. In one example, the respective equivalent reactance value may be computed as a function of sine of angle equivalent of step time and samples of voltage and current, where the step time refers to the sampling frequency.

At block 406, a first fault location based on the calculated equivalent reactance value is determined. Based on the calculated respective at least one subsequent equivalent reactance value, at least one subsequent fault location may be determined. The respective fault location may be based on the respective equivalent reactance value where, the corresponding equivalent reactance value is divided by a per unit reactance of the transmission line. The per unit reactance of the transmission is a function of the system frequency measured in radians/second, and the inductance of the transmission line.

A refined fault location based on detection of a convergence between the first fault location and the at least one subsequent fault location may be determined. In one example, the convergence may be detected when a difference between two consecutive ones of the first fault location and the at least one subsequent fault location is smaller than a threshold. In one example, the threshold value may be set to 0.5% of a length of the transmission line.

In one example, the refined fault location may be an average of at least a subset of the first fault location and the least one subsequent fault location. An average of the first fault location and the least one subsequent fault location may be formed by applying a second moving window average filter to the fault location estimates. The size of the second moving window applied may take any positive integer value from one to 'n', where 'n' is a positive integer value. In one example, the size of second moving window considered may be 5 samples to smoothen the fault location estimates.

In one example, when selecting a refined fault location if the difference between the two consecutive ones of the first fault location and the at least one subsequent fault location is greater than the threshold value for a repeated number of computations, the threshold value may be increased by a small percentage, for example 0.1%, and the process of selecting the fault location may be repeated.

On detecting a fault, for example during a power swing, the fault location determination module 322 of the device 508 may be configured to determine the exact fault location. Further, the fault location may be determined even during a fault under normal operations. In one example, the voltage and current measurements are single-ended time domain-based measurements. Further, the fault location determination module 322 of the device 508 may be configured to calculate a zone-limpedance for distance protection based on the fault location.

EXAMPLES

Different fault scenarios different type of faults, different values of fault resistance, source to line impedance ratios, fault locations, slip frequencies during a power swing period and for faults during normal operations were created and tested to determine the performance of the proposed fault location method.

In a first scenario, the technique of fault location determination was tested for a 400 kV, 50 Hz transmission line of length 200 kilometres. The samples of voltage and current are collected at a sampling frequency of 1 kHz from both the terminals. A first test case with a line-to-ground fault A-g fault at a distance of 5 km from terminal A was considered. The fault resistance was considered to be 5 ohms and the time of inception of the fault was 1.25 seconds.

Figure 5:
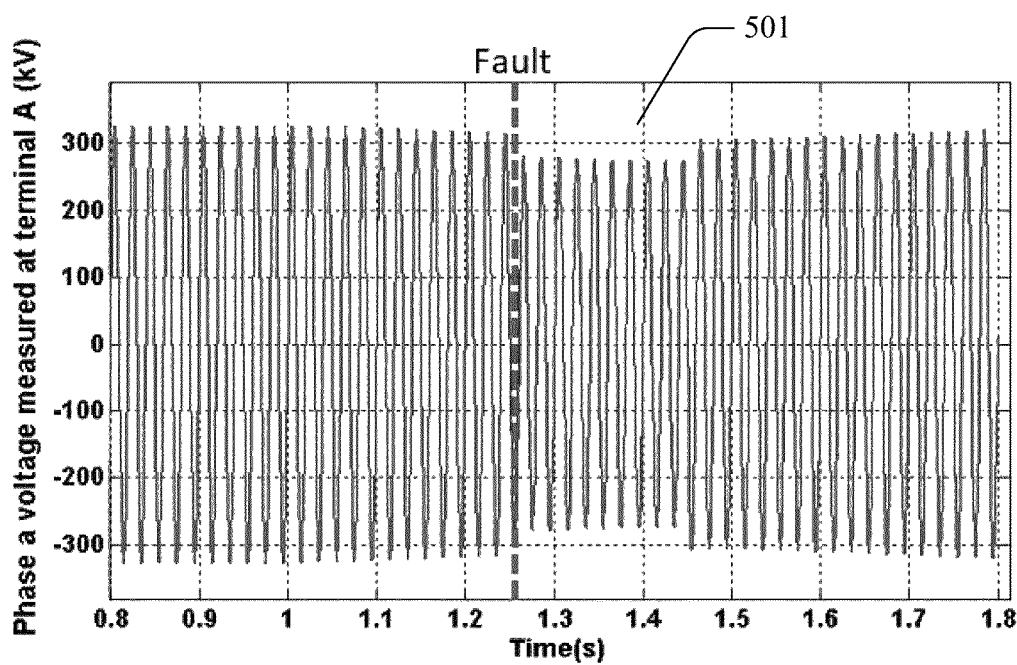
FIG. 5 illustrates smoothened voltage and current waveforms obtained on pre-processing, in accordance with an embodiment of the present subject matter.
Figure 5:
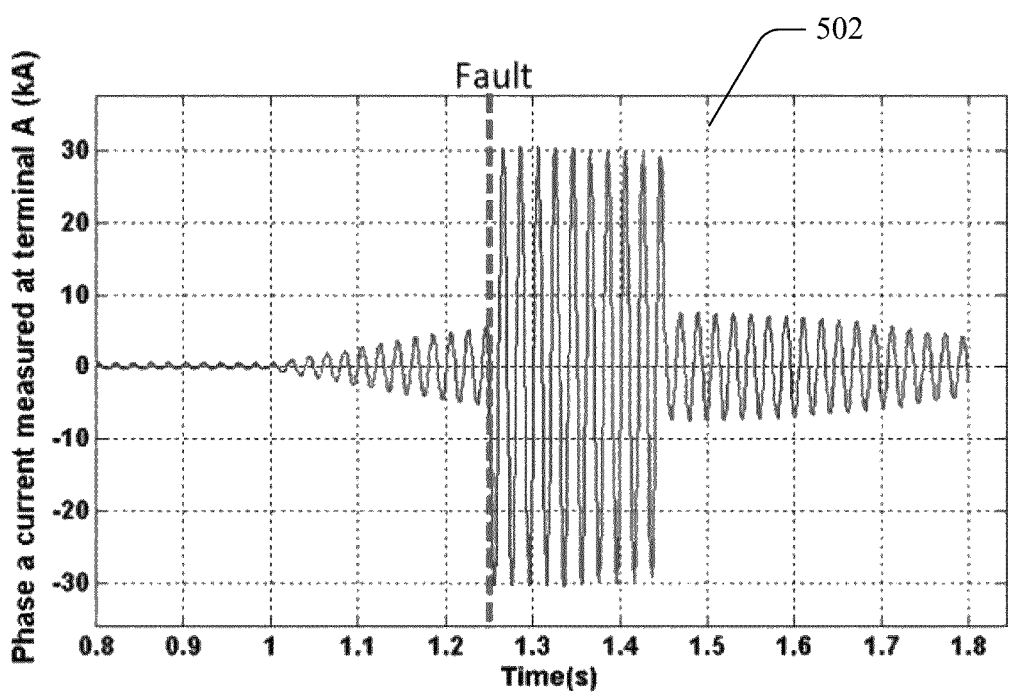

For the first case, instantaneous voltage and current measurements were obtained from terminal M. These raw signals obtained were pre-processed by applying a first moving window average filter. The size of the first moving window considered was 5 samples. The voltage and current signals measured are pre-processed in order to avoid false estimates due to noise or undesired components that may be present in the signals. FIG. 5 illustrates smoothened voltage and current waveforms obtained on pre-processing, in accordance with an embodiment of the present subject matter. Graph 501 illustrates voltage of phase A measured in kilo-Volts at the terminal M plotted against time in seconds and graph 502 illustrates current of phase A measured in kilo-Amperes at the terminal M plotted against time in seconds.

Figure 6:
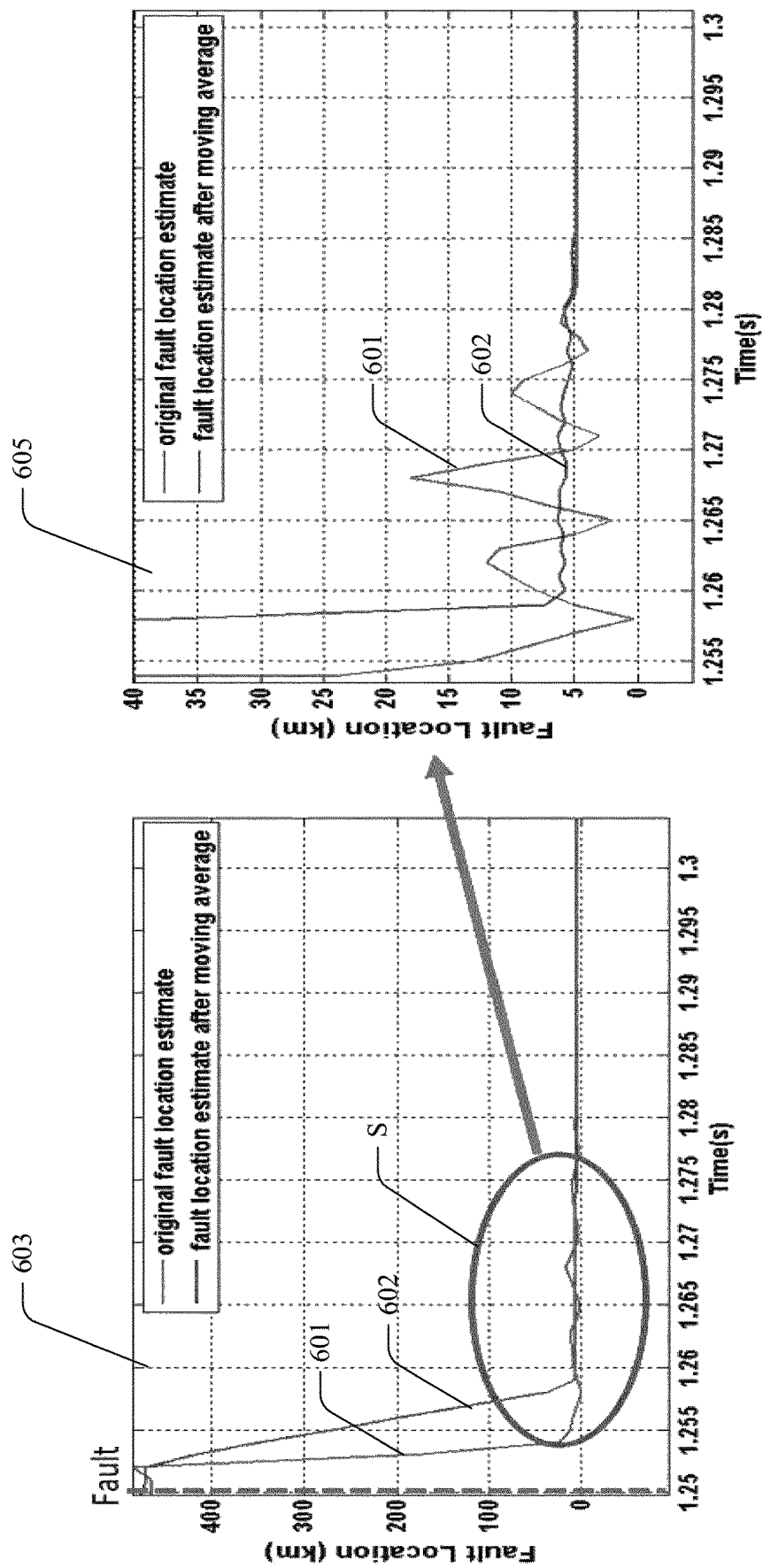
FIG. 6 depicts fault location estimates with post-processing and without post processing, in accordance with an embodiment of the present subject matter.

After pre-processing the voltage and current signals a fault location is calculated corresponding to each sample. The estimate for each sample uses the voltage and current instantaneous values at that sample and the four previous samples. FIG. 6 depicts fault location estimates with post-processing and without post processing, in accordance with an embodiment of the present subject matter. The fault location estimates measured in kilometers are plotted against time in seconds. The line 601 represents the original fault location determined without post-processing the fault locations estimated. A second moving average filter is applied to the original fault locations estimated. The size of the second moving average filter used is of 5 samples. The line 602 represents the fault location estimated after applying the second moving average filter with time. Graph 605 shows the portion S of graph 603 in greater detail. It can be clearly observed from graph 605 that post-processing of the fault location estimates using moving average, results in a faster convergence of the solution for determining the accurate fault location. It is observed that the fault location estimate converges within the set threshold of 500 meters and within 1.25 power cycles after the fault. Further, an average value of 5 fault location estimates may be computed as the refined fault location for higher levels of accuracy.

The same test case scenario as discussed above was used to study the influence of increased slip frequency on the performance of the method to determine the fault location with respect to the present subject matter. The test case was for a line to ground A-g fault at a distance of 5 km from the terminal M of a 400 kV transmission line at 50 Hz. The length of the transmission line considered was 200 km with a fault resistance of 5 ohms. The inception of fault was considered to be at the swing crest. Table 2 shown below depicts the test results of the analysis. It can be observed from the table that the influence of the slip frequency is negligible. Though the error in estimating the fault location has an increasing pattern with the increase in the slip frequency, the accuracy in determining the fault location in accordance with the present subject matter is well within the desired range. The threshold value for determining the fault location was set to 0.5% of a length of the transmission line.

TABLE 2

INFLUENCE OF SLIP FREQUENCY ON THE METHOD TO DETERMINE THE FAULT LOCATION

| Slip frequency | Actual fault location (km) | Estimated fault location (km) | Error in fault location (%) |
| --- | --- | --- | --- |
| 1 Hz | 5 | 4.995 | 0.002 |
| 2 Hz | 5 | 4.94 | 0.02 |
| 3 Hz | 5 | 4.8 | 0.10 |
| 4 Hz | 5 | 4.76 | 0.117 |
| 5 Hz | 5 | 4.77 | 0.114 |

Figure 7:
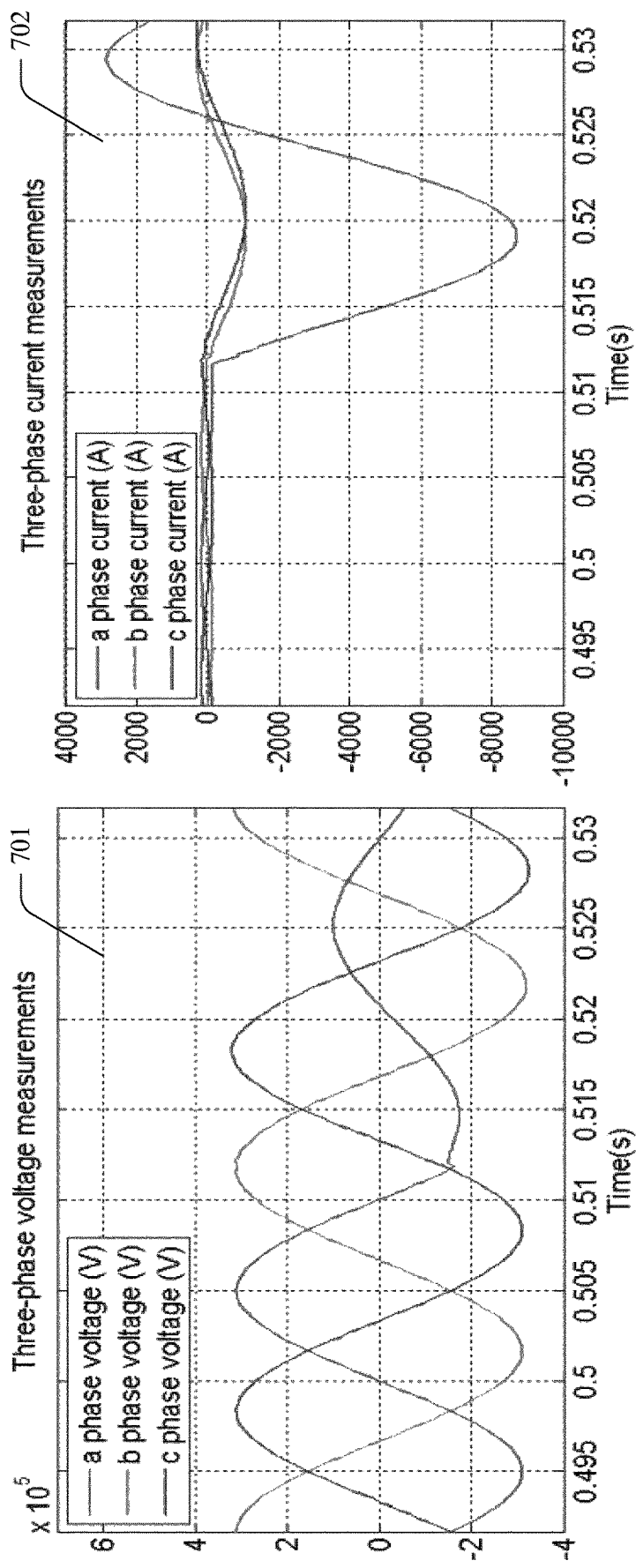
FIG. 7 shows three-phase voltage and current input signals measured, in accordance with another example implementation of the present subject matter.
Figure 8:
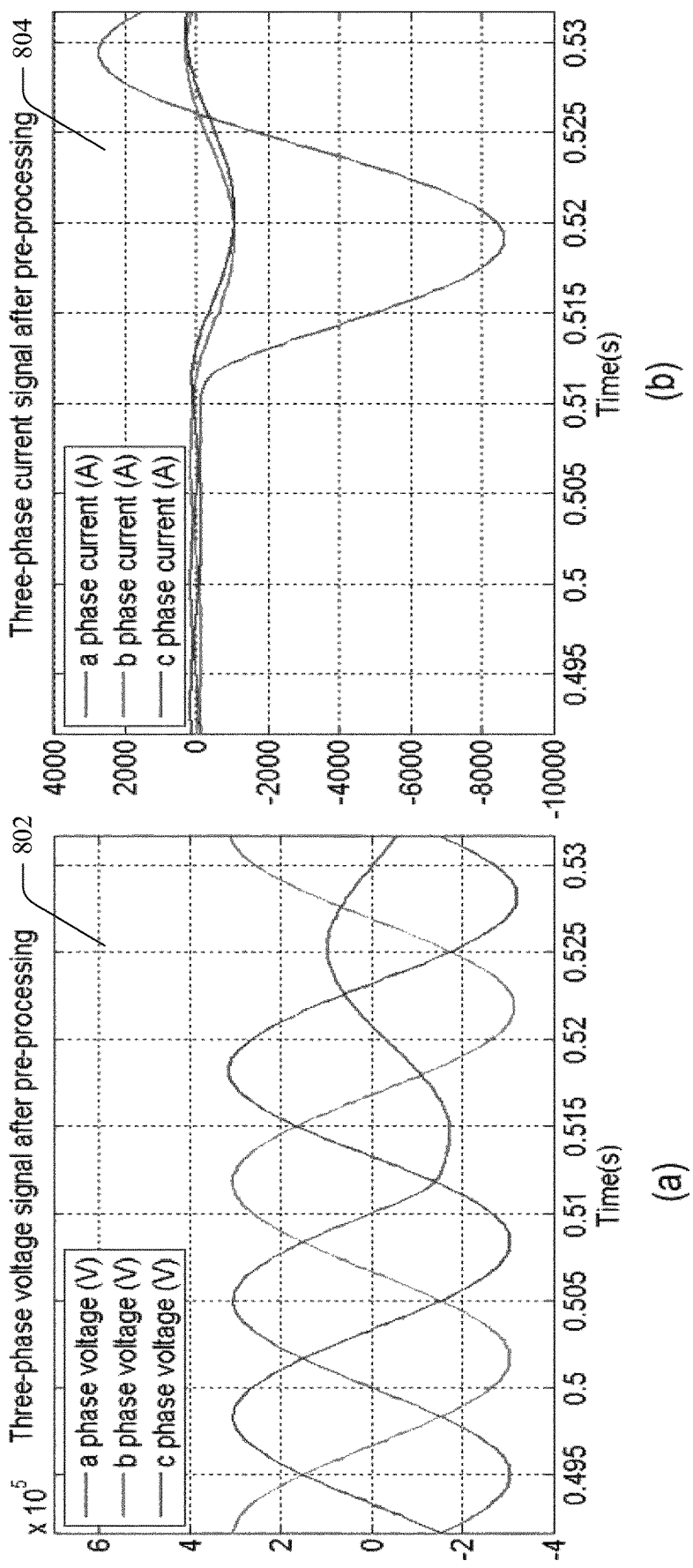
FIG. 8 depicts the three-phase voltage and current signals after pre-processing, in accordance with another example implementation of the present subject matter.
Figure 9:
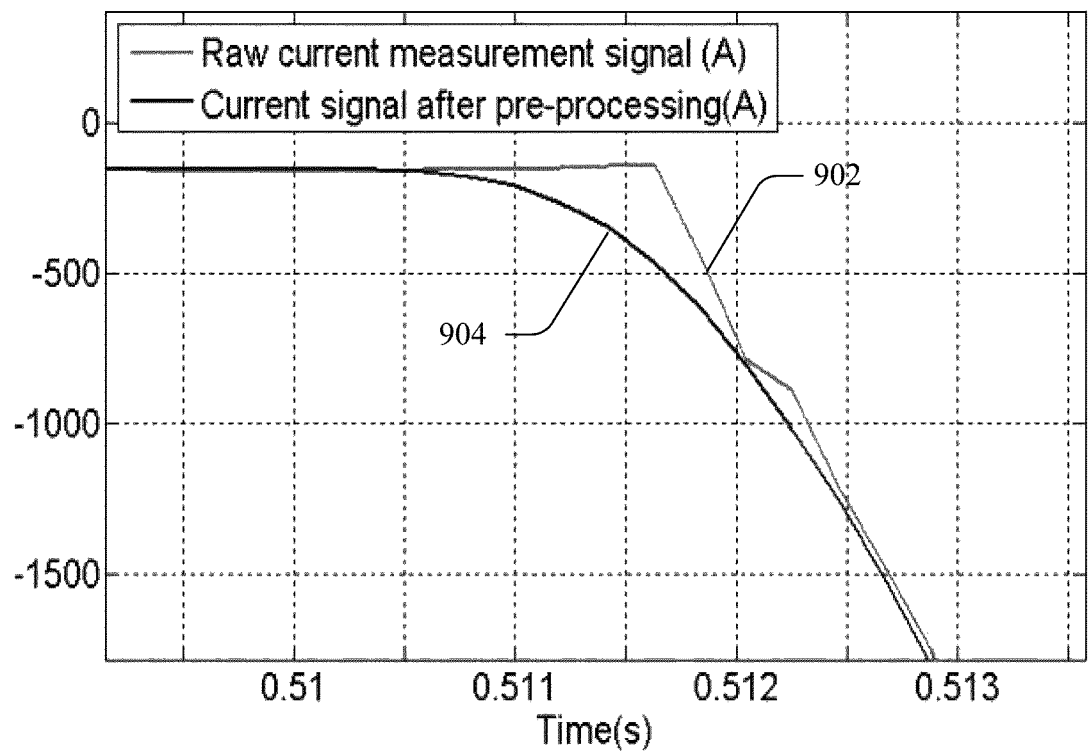
FIG. 9 depicts a small segment of faulty phase A current, in accordance with another example implementation of the present subject matter.

In a second scenario, the technique of fault location determination according to the present subject matter was tested for calculating a time-domain based zone-1 impedance calculation for distance protection. A sample test case of a line to ground A-g fault was considered at 20% of a 200 km long 400 kV, 50 Hz transmission line. That is a fault at 40 km of the transmission line from the terminal M was considered. The fault resistance was 0.1 ohm and the source to line impedance ratio of the local source and remote source considered were 0.1 and 0.5 respectively. Further, the fault was considered to be incepted at an angle of 210 degrees and the time of inception of the fault was 0.5116 seconds. FIG. 7 shows three-phase voltage and current input signals measured, in accordance with another example implementation of the present subject matter. Graph 701 depicts three phase voltages measured at a terminal M and graph 702 depicts three phase currents measured at the terminal M. Similarly, FIG. 8 depicts the three-phase voltage and current signals after pre-processing, in accordance with another example implementation of the present subject matter. The pre-processing was done using two passes of moving average filter, i.e., the moving average was computed twice. Graph 802 depicts three phase voltages at terminal M plotted against time and graph 804 depicts three phase currents at terminal M plotted against time. FIG. 9 depicts a small segment of faulty phase A current, in accordance with another example implementation of the present subject matter. FIG. 9 demonstrates the advantage of pre-processing voltage and current signals to determine the fault location. Line 902 depicts the current signal of phase A without applying the moving average filter and Line 904 depicts the current signal of phase A after pre-processing. It can be clearly observed from FIG. 9 that pre-processing of the voltage and current measurement signals using moving average, results in a smoother waveform free from noise and transients.

Figure 10:
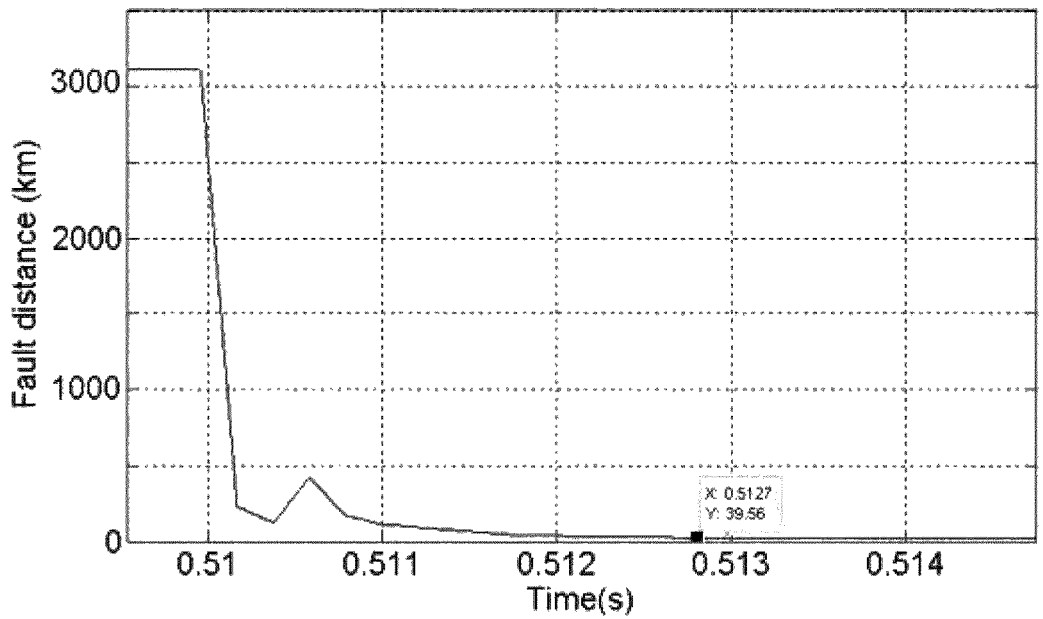
FIG. 10 depicts the plot of the fault location estimates calculated using instantaneous values of pre-processed currents and voltages, in accordance with another example implementation of the present subject matter.
Figure 11:
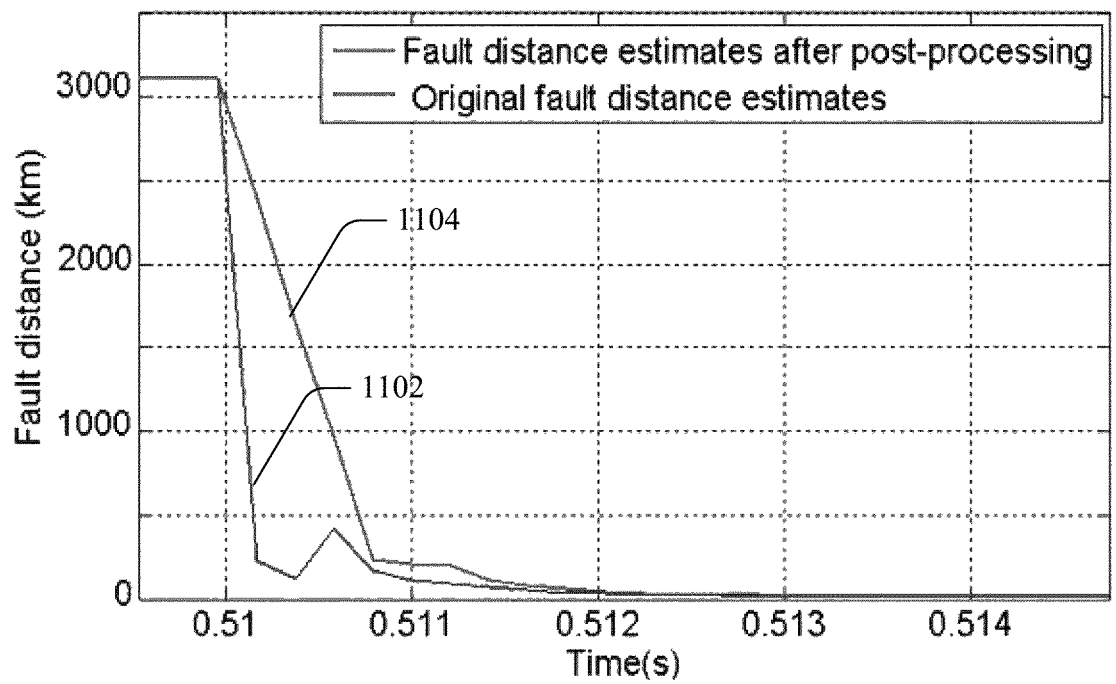
FIG. 11 shows the plot of fault location estimates before and after post-processing, in accordance with another example implementation of the present subject matter.

Further, FIG. 10 depicts the plot of the fault location estimates calculated using instantaneous values of pre-processed currents and voltages, in accordance with another example implementation of the present subject matter. In this case, the fault location is calculated accurately within a quarter cycle, where one electrical cycle is 20 ms for a 50 Hz frequency system. FIG. 11 shows the plot of fault location estimates before and after post-processing, in accordance with another example implementation of the present subject matter. Line 1102 depicts fault distance estimates in kilometres plotted against time and Line 1104 depicts fault distance estimates in kilometres after applying the moving average filter plotted against time. It can be observed from FIG. 11 that the fault distance estimates are smoothened and oscillations which can lead to erroneous results are removed by the moving average filter. This method of determining the fault distances provide accurate results, especially in scenarios where the oscillations are high and random.

Figure 12:
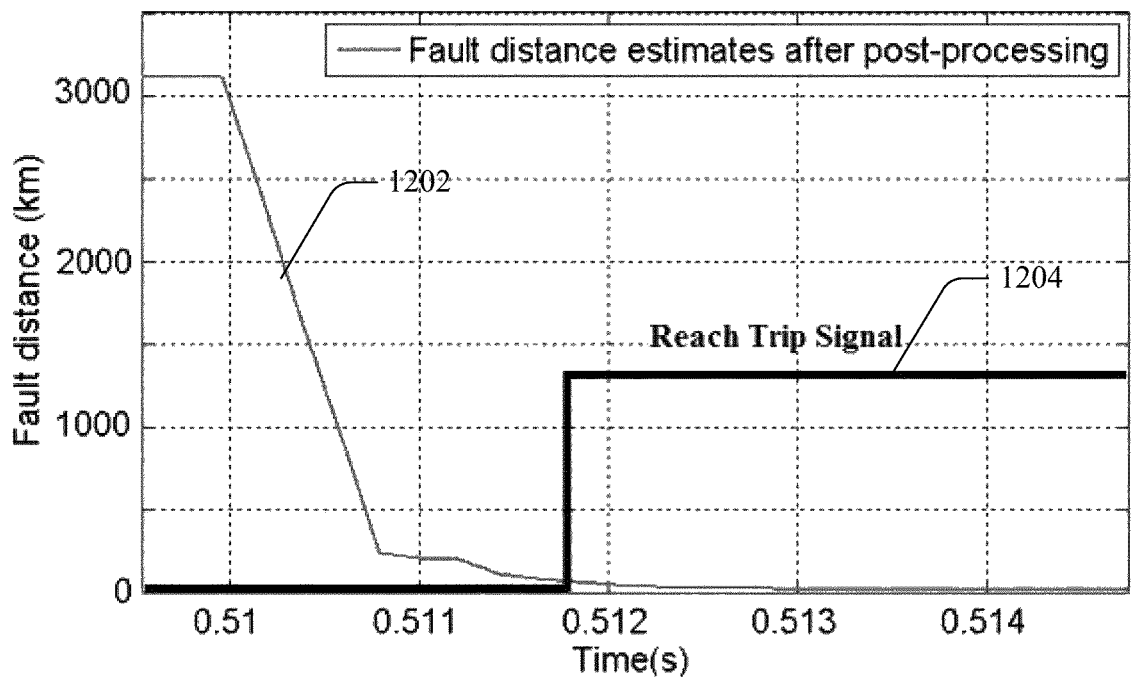
FIG. 12 depicts the generation of zone-1 trip signal after the fault impedance is calculated, in accordance with another example implementation of the present subject matter.

Once the fault distance is calculated, a trip signal based on distance protection is generated. The trip signal is generated once the fault distance goes below a threshold value. The threshold value for triggering the trip signal is generally set to 80% of the transmission line length, which can be suitably tuned. FIG. 12 depicts the generation of zone-1 trip signal after the fault impedance is calculated, in accordance with another example implementation of the present subject matter. Line 1202 depicts the fault distance estimates determined after post-processing and Line 1204 depicts the zone-1 trip signal from distance protection being generated. The trip signal was issued within 1.5 milliseconds after fault inception.

The results obtained from the method for fault location determination are compared to determining the fault locations by techniques known in the art. The technique used for comparing the results corresponds to the technique discussed with respect to FIG. 1 and FIG. 2. The tests have been conducted with faults during power swing and similar results shall be obtained for location of faults during normal operation.

A 400 kV, 50 Hz, 100 km transmission system has been modelled and tested using frequency dependent phase model in PSCAD. A Power swing with a slip frequency of 1 Hz was created. Different fault scenarios including different fault types, fault resistances, source to line impedance ratios, fault locations and fault inception angles were created to test the method for determining the fault location in accordance with the present subject matter. It was observed that the average error was found to be less than 1% for the proposed solution whereas the average error for the conventional method of determining the fault location solution was found to be approximately 10%.

Figure 13:
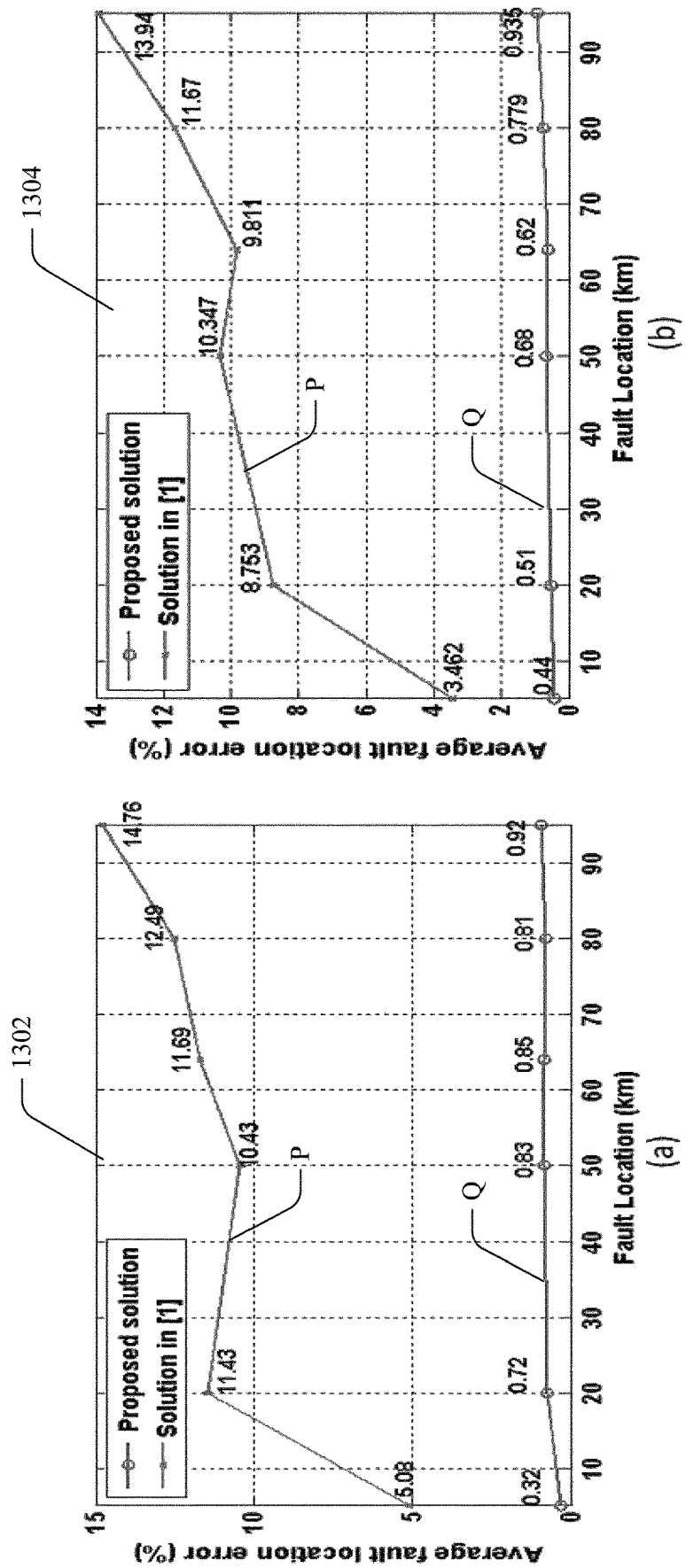
FIG. 13 depicts the comparison in performance of the proposed method and the method known in the art for various fault locations: for (a) line-to-ground fault and (b) line-to-line fault.

FIG. 13 depicts the comparison in performance of the proposed method and the method known in the art for various fault locations, for (a) line-to-ground fault and (b) line-to-line fault. Graph 1302 and graph 1304 depict the average fault location error (%) plotted against the fault location in kilometres for a line-to-ground fault and a line-to-line fault respectively. Graph 1302 depicts the average percentage error in fault location estimate for A-g fault with a fault resistance of 10 ohms. Line P depicts the average percentage error in fault location estimate for A-g fault with respect to the method known in the art and Line Q depicts the average percentage error in fault location estimate for line-to-ground A-g fault with plotted in accordance with the present subject matter. It can be observed from the graph 1302 that the average error is less than 1% for the proposed solution whereas it goes as high as 15% for the solution provided by the conventional method. Similarly, graph 1304 depicts the average percentage error in fault location estimate for a line-to-line AB fault with a fault resistance of 5 ohms. It can be observed from the graph 1304 that the plot shows that the average error is less than 1% for the proposed solution whereas it goes as high as 13% for the solution provided by the conventional method.

Figure 14:
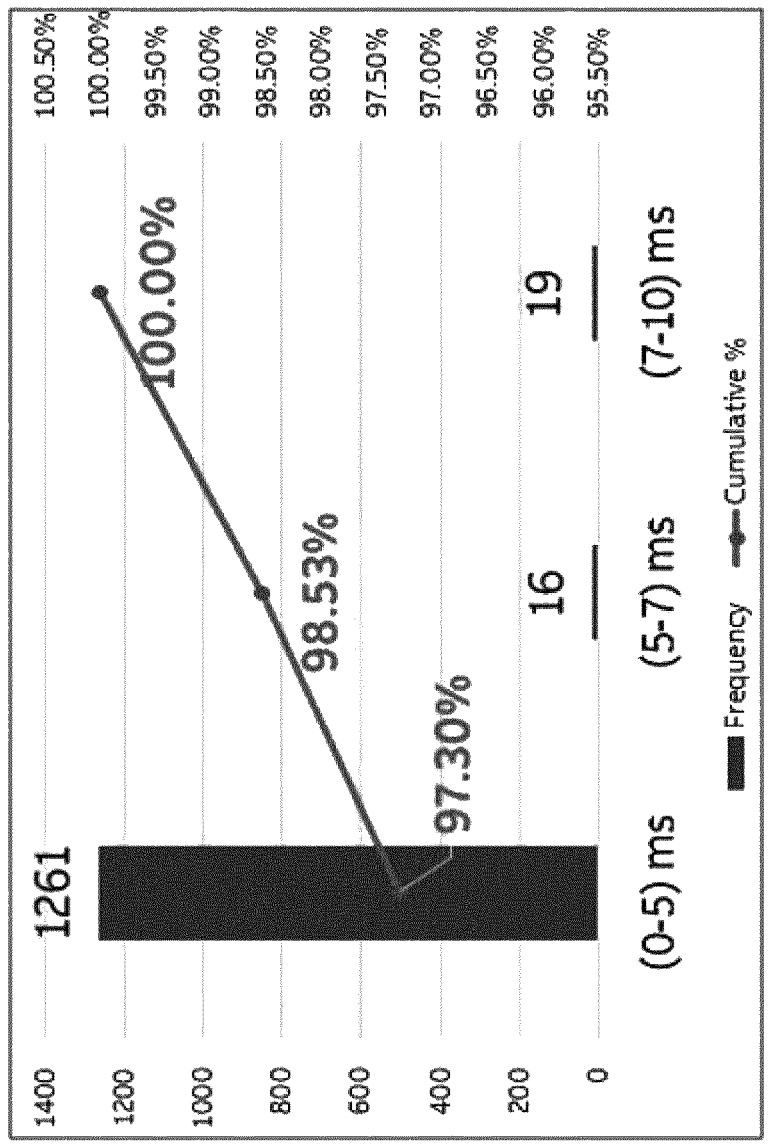
FIG. 14 depicts the histogram for a trip, in accordance with another example implementation of the present subject matter.

Test results are provided after testing the proposed time-domain based fault location method for zone-1 impedance calculation for distance protection. A test system with a 400-kV transmission line of length 200 km was considered. The load case was considered to be 80% of the forward load. Various fault parameters including fault location, fault resistance, fault inception angle, source to line impedance ratio and fault type were varied and tested. The test results showed that, considering protection up to 64% of the transmission line, the solution provided by the present subject matter was a 100% reliable. FIG. 14 depicts the histogram for a trip, in accordance with another example implementation of the present subject matter. It can be observed that for almost 97.3% of the test cases, a trip signal was issued within 5 ms after fault inception. For almost 98.5% of the test cases, the trip signal was issued within 7 ms after fault inception. All cases with a trip time >7 ms, are faults with a fault inception angle of 135 degree. The maximum trip time observed was 9.79 ms and the average trip time was 3.16 ms. The proposed method is validated with different fault scenarios and achieved the average error is less than 1% for 100 km transmission line. This method requires only local information and a low sampling rate of 1-4.8 kHz. It can be used for location of faults during power swing as well as during normal operation. This method is used for zone-1 impedance calculation in the application of time domain-based distance protection.

The present subject matter thus provides an accurate single ended method to determine the fault location for faults that occur during power swing and normal operation. The method also provides zone-1 impedance calculation in the application of time domain-based distance protection. Thus, determination of the fault location and fault impedance calculation can be reliably performed for a fault that occurs during power swing or normal operation using the methods and devices of the present subject matter.

The invention claimed is:

1. A method for fault location in a power transmission system, the method comprising:
    obtaining samples of voltage and current measured at a terminal of the transmission line during a fault;
    calculating a first equivalent reactance value based on the samples of voltage and current;
    determining a first fault location based on the calculated equivalent reactance value;
    calculating at least one subsequent equivalent reactance value based on subsequent samples of voltage and current; and
    determining at least one subsequent fault location based on the calculated respective at least one subsequent equivalent reactance value.

2. The method as claimed in claim 1, comprising determining a refined fault location based on detection of a convergence between the first fault location and the at least one subsequent fault location.

3. The method as claimed in claim 2, wherein the convergence is detected when a difference between two consecutive ones of the first fault location and the at least one subsequent fault location is smaller than a threshold.

4. The method as claimed in claim 2, wherein the refined fault location is an average of at least a subset of the first fault location and the least one subsequent fault location.

5. The method as claimed in claim 4, wherein forming an average of the first fault location and the least one subsequent fault location comprises applying a second moving window average filter to the fault location estimates.

6. The method as claimed in claim 1, wherein the method is executed during a power swing.

7. The method as claimed in claim 1, wherein the respective equivalent reactance value is computed as a function of sine of angle equivalent of step time and samples of voltage and current.

8. The method as claimed in claim 1, wherein averaged values of the samples of voltage and current are used for calculating the equivalent reactance value.

9. The method as claimed in claim 1, wherein determining the respective fault location comprises dividing the corresponding equivalent reactance value by a per unit reactance of the transmission line.

10. The method as claimed in claim 1, comprising calculating a zone-1 impedance for distance protection based on the fault location.

11. The method as claimed in claim 1, wherein the voltage and current measurements are single-ended time domain-based measurements.

12. A non-transitory computer readable medium comprising instructions that, when executed by a processor, cause the processor to execute the method of claim 1.

13. A method for fault location in a power transmission system, the method comprising:
    obtaining samples of voltage and current measured at a terminal of the transmission line during a fault;
    calculating a first equivalent reactance value based on the samples of voltage and current, wherein averaged values of the samples of voltage and current are used for calculating the first equivalent reactance value, wherein averaged values of the samples of voltage and current are formed by applying a first moving window average filter to the samples of voltage and current; and
    determining a first fault location based on the calculated equivalent reactance value.

14. A device for determining a fault location in a power transmission system, the device comprising:
    a processor; and
    a fault location determination module executable by the processor to:
        obtain samples of voltage and current measured at a terminal of the transmission line during a fault;
        calculate a first equivalent reactance value based on the samples of voltage and current;
        determine a first fault location based on the calculated equivalent reactance value;
        calculate at least one subsequent equivalent reactance value based on subsequent samples of voltage and current; and determine at least one subsequent fault location based on the calculated respective at least one subsequent equivalent reactance value.

15. The device as claimed in claim 14, wherein the fault location determination module is to determine a refined fault location based on detection of a convergence between the first fault location and the at least one subsequent fault location, wherein the convergence is detected when a difference between two consecutive ones of the first fault location and the at least one subsequent fault location is smaller than a threshold; and wherein the refined fault location is an average of at least a subset of the first fault location and the least one subsequent fault location.

16. The device as claimed in claim 14, wherein averaged values of the samples of voltage and current are used for calculating the equivalent reactance value;

wherein the fault location determination module is to apply a first moving window average filter to the samples of voltage and current to form averaged values of the samples of voltage and current; and apply a second moving window average filter to the fault location estimates to form an average of the first fault location and the least one subsequent fault location.

17. The device as claimed in claim 16, wherein the fault location determination module is to divide the corresponding equivalent reactance value by a per unit reactance of the transmission line to determine the respective fault location.

18. The device as claimed in claim 14, wherein the fault location determination module is to calculate a zone-1 impedance for distance protection based on the fault location; and wherein the voltage and current measurements are single-ended time domain-based measurements.

* * * * *